United States Patent [19]

Neary

[11] Patent Number: 4,512,324
[45] Date of Patent: Apr. 23, 1985

[54] FUEL PREHEATER

[75] Inventor: David Neary, 12716 E. 137 St., Broken Arrow, Okla. 74011

[73] Assignee: David Neary, Broken Arrow, Okla.

[21] Appl. No.: 597,959

[22] Filed: Apr. 9, 1984

[51] Int. Cl.³ ............................................. F02M 31/00
[52] U.S. Cl. .................................... 123/557; 123/549; 123/552; 219/205
[58] Field of Search ......................... 123/557, 549, 552; 219/301, 205, 206, 207, 271; 261/142

[56] References Cited

U.S. PATENT DOCUMENTS

| | | | |
|---|---|---|---|
| 1,168,111 | 1/1916 | Pope | 123/557 |
| 2,048,104 | 7/1936 | Clinefeller | 123/557 |
| 3,110,296 | 11/1963 | Lundi | 123/557 |
| 3,951,124 | 4/1976 | Fairbanks | 123/557 |
| 3,989,486 | 10/1976 | Rabbios | 123/557 |
| 4,044,742 | 8/1977 | Linder | 123/557 |
| 4,259,937 | 4/1981 | Elliot | 123/549 |
| 4,325,345 | 4/1982 | Wilkinson | 123/557 |
| 4,333,422 | 6/1982 | Mahoney | 123/557 |
| 4,395,995 | 8/1983 | Crain | 123/557 |
| 4,397,288 | 8/1983 | Kelling | 123/557 |

Primary Examiner—Ronald H. Lazarus
Attorney, Agent, or Firm—John L. Gray

[57] ABSTRACT

A fuel preheater for liquid fuel having a multi-pass heat exchanger for said fuel, heated by an electrical resistance heater provided with a sensor adjacent the device designed to burn the fuel, the sensor controlling the flow of electrical current to said heater. The heat exchanger is preferably made from extruded stock and a material having good heat conductivity. If the device burning the fuel is a water cooled device, a separate heat exchanger using such heated water may be placed in series with the preheater in order to augment it.

16 Claims, 5 Drawing Figures

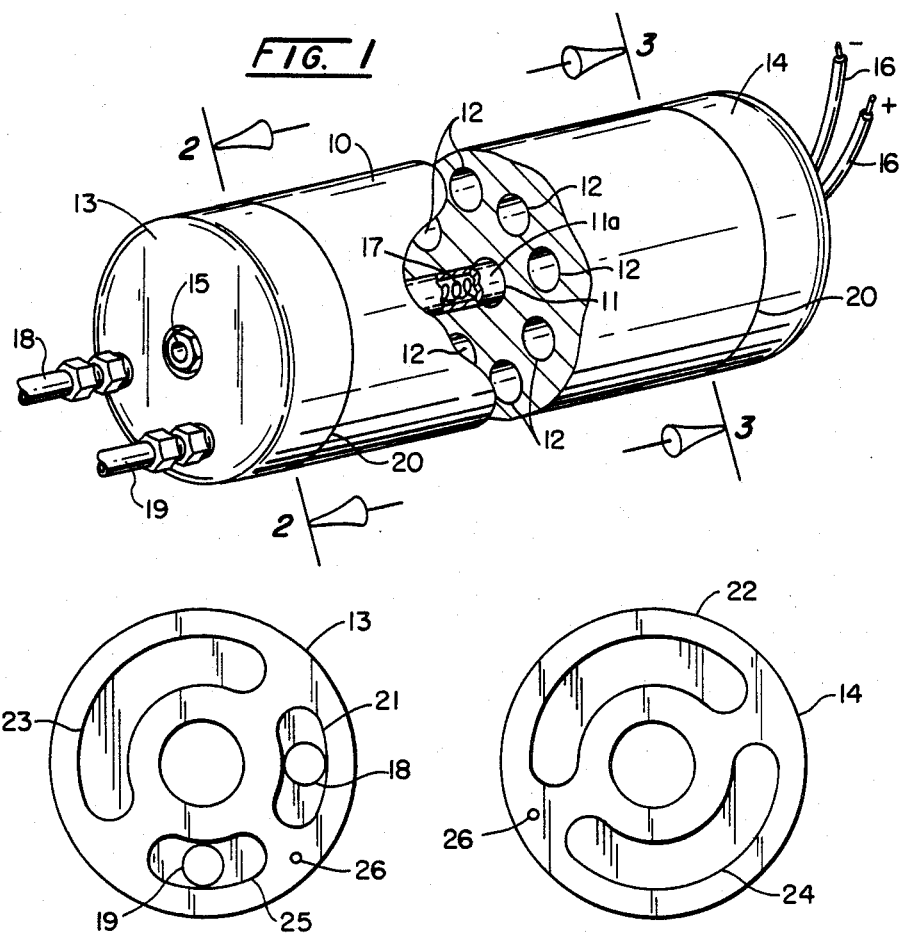
FIG. 1
FIG. 2
FIG. 3
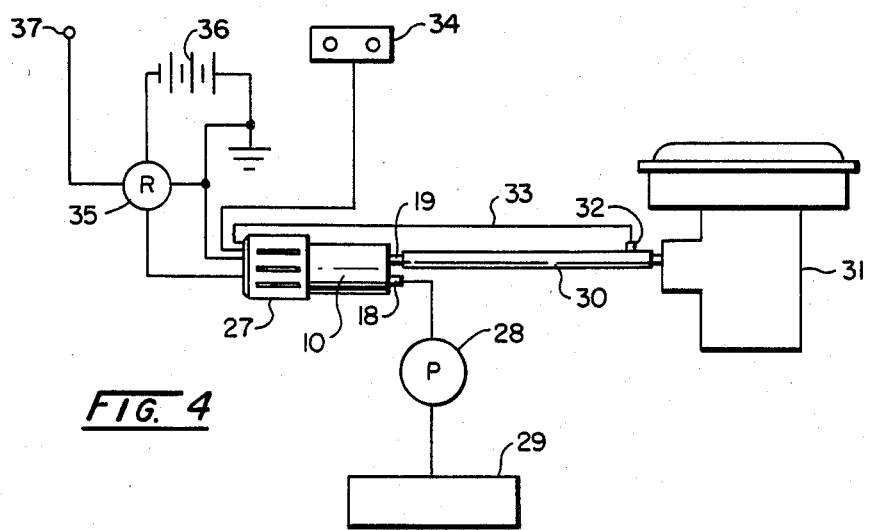
FIG. 4

FUEL PREHEATER

BACKGROUND OF THE INVENTION

Co-pending U.S. patent application Ser. No. 356,061, Dodrill, entitled "Method of Treating Fuel for An Internal Combustion Engine to Improve Mileage" indicates that by heating fuel to an optimum temperature, the combustion efficiency of the fuel is significantly improved.

In the case of prime movers on vehicles using gasoline-powered internal combustion engines or diesel engines, the present method of preheating the fuel is to route the fuel lines close to the engine block in order to pick up radiated heat. This, however, provides no means of controlling the fuel temperature and is ineffective because of the inadequate fuel line heat transfer area and the great variations in the ultimate fuel temperature, depending upon ambient air temperature and fuel flow rate through the fuel line, in turn depending upon the speed of the vehicle.

SUMMARY OF THE INVENTION

Applicant's invention is a compact, easily manufactured, preheater which is susceptible of extremely accurate control so that the fuel temperature may be kept within one-half of one degree Farenheit upon entering the device which will burn the fuel.

Applicant's invention also permits the construction of a variety of sizes of heat exchangers, depending upon the size of the associated fuel-consuming device involved, with a minimum of manufacturing costs for different size models.

It is, therefore, an object of this invention to provide a compact, easily constructed, accurately controllable, heat exchanger for preheating fuel for a device which will burn the fuel.

It is another object of this invention to provide such a device which may be made in a variety of sizes from the same initially fabricated stock.

It is another object of this invention to achieve extremely good heat transfer by maximizing the time of exposure of the fuel to the source of heat prior to entering the device which will burn the fuel.

It is a still further object of this invention to provide such a device which may be used to preheat fuel for internal combustion engines, diesel engines, and oil burning heaters.

It is a still further object of this invention to provide such a device which will be susceptible to extremely accurate temperature control.

These, together with other objectives and advantages of the invention, should become apparent in the details of construction and operation, as more fully described herein and claimed, reference being had to the accompanying drawings forming a part hereof wherein like numerals refer to like parts throughout.

BRIEF DESCRIPTION OF THE INVENTION

FIG. 1 is a perspective view of the heat exchanger constituting a portion of this invention with a portion of the interior of the device exposed to view.

FIG. 2 is a section of FIG. 1 on the line 2—2.

FIG. 3 is a section of FIG. 1 on the line 3—3.

FIG. 4 is a schematic diagram of the device as it would be installed in a motor vehicle utilizing an internal combustion engine.

DETAILED DESCRIPTION OF THE INVENTION

Figure 5:
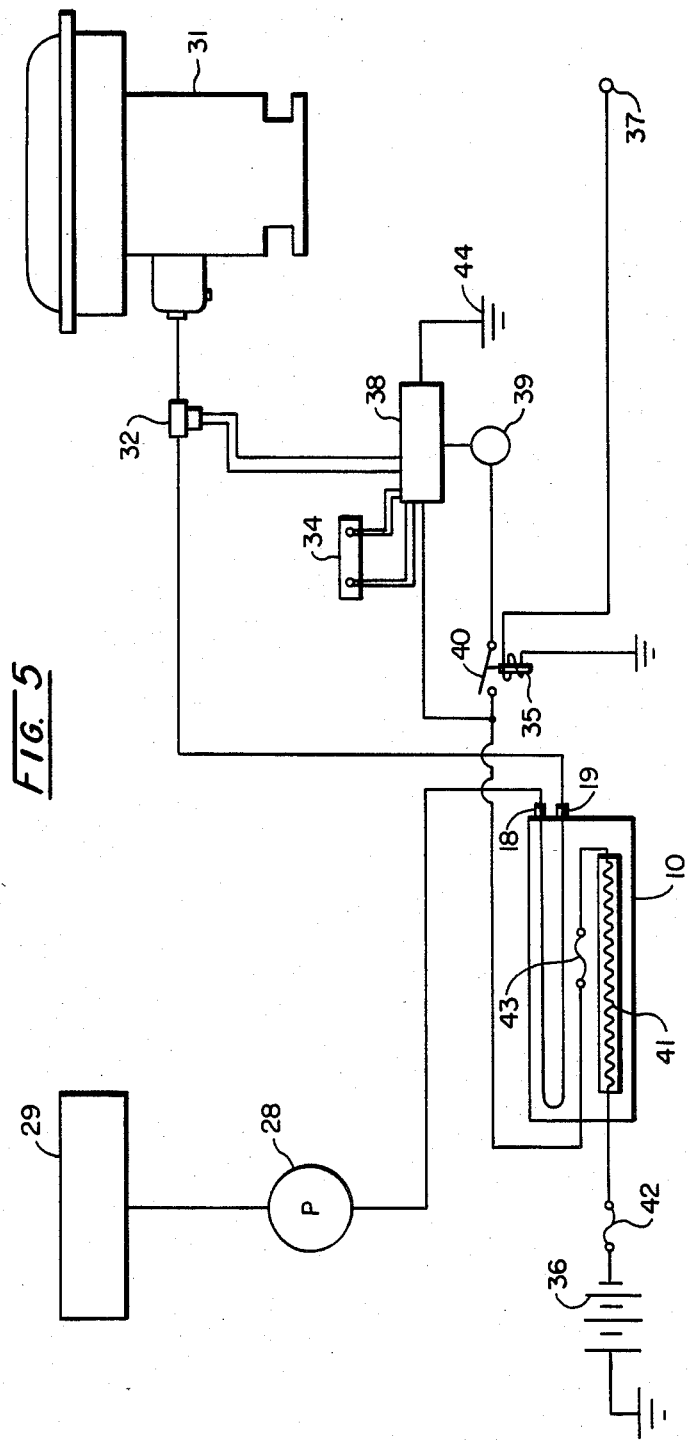
FIG. 5 is a wiring diagram showing the control system for the device.

Referring now more particularly to the drawings, especially FIG. 1, the basic heat exchange unit is shown at 10. This is preferably made of extruded aluminum alloy or copper alloy bar stock and is provided with a centrally disposed tube 11 extending throughout its entire length and a plurality of extruded tubes 12—12, preferably equi-spaced around heat exchange unit 10's axis and also extending throughout the length of the heat exchange unit 10. The heat exchange unit 10 is preferably provided with end caps 13 and 14 which may be held in place by means of bolts 15—15 at each end which are threadedly connected to tube 11 which may be threaded at each outer end to accommodate said bolts 15—15. Both of the bolts 15—15 may be hollow to accommodate the metal tubular sheath 11a enclosing heating element 17, which may be introduced from one end or from both ends of the heat exchanger. The heating wires 16—16 are connected to the heating element 17. Said heating element 17 is electrically insulated from its metallic sheath 11a.

Connections for fuel to enter and leave the heat exchanger are shown at 18 and 19, respectively. In connecting the end caps 13 and 14 to the heat exchange unit 10, appropriate gaskets 20—20 should be used.

Referring now more particularly to FIGS. 2 and 3, it will be seen that the fuel enters the heat exchange unit 10 through line 18. It will immediately be connected to two parallel tubes 12—12 because of the opening 21 in end cap 13 in registration with those two tubes 12—12. The fuel will flow through the two tubes 12—12 and will be deposited in trough 22 of end cap 14, which will permit the fuel to flow in the opposite direction in the next two adjacent tubes 12—12 and be returned to trough 23 in end cap 13. Again the fuel flow will be reversed and the fuel will flow through the next two adjoining tubes 12—12 to the trough 24 in end cap 14. Again the fuel flow will be reversed and the fuel will flow through the next two adjoining tubes 12—12 into opening 25 in end cap 13 and then out of tube 19. Alignment pin holes 26—26 are provided in each end cap and appropriate matching pins are provided on heat exchange unit 10.

If desired, the troughs, which are shown in end caps 13 and 14 in FIGS. 2 and 3, may be milled in to the end of heat exchange unit 10 so that the end caps merely can be flat pieces provided with gaskets. Thus multi-pass heat exchanger consists of only three elements: the two end caps 13 and 14 and the heat exchange unit 10. Heat is transferred through only one piece of metal into the fuel by using an aluminum alloy or copper alloy extrusion for the heat exchanger cylinder, and no machining or fabrication work is required to form the fuel passages in the heat exchanger cylinder. For a particular fuel heat transfer requirement, the necessary heat transfer area may be obtained merely but cutting off the proper length of heat exchange unit 10 from a much longer extrusion, which may be 12 feet in length. The same two end caps 13 and 14 will fit all heat exchanger size requirements and the same tubular heater diameter is employed for all applications. Only the wattage of the heater element or the length and wattage of the unit may be changed to fit varied applications.

Referring now more particularly to FIG. 4, the heat exchange unit 10 is shown in an insulated jacket with an integral mounted controller 27 placed thereon. Tube 18 is shown connected through the fuel pump 28 to the fuel tank 29. Tube 19, containing the discharge from the heat exchange unit 10, is connected to an insulated, flexible fuel hose 30, which in turn is connected in this case to the carburetor 31 or diesel injection pump assembly, or gasoline injection assembly for an internal combustion engine or fuel oil burner injector assembly. The thermister temperature sensor 32 is electrically connected by means of a double strand wire 33 to the integral mounted controller 27. Optional display lights 34—34 may be provided on the dashboard and the electrical connections to the controller 27 are connected to a relay 35, which is connected to the vehicle's battery 36 with the entire electrical system actuated by the ignition switch 37.

Referring now more particularly to FIG. 5, the fuel tank 29 is shown with the fuel pump 28 connected to line 18 into the heat exchange unit 10. The fuel exits through line 19 and being conducted to the carburetor 31 or diesel injection pump assembly or gasoline injection pump assembly. Thermister sensor 32 is connected to a temperature control circuit 38 of a solid-state design, which when placed in series with thermal fuse 43, provides a fail-safe circuit. Said circuit 38 may be connected to optional display lights 34—34, and circuit 38 shares a common electrical ground contact 44 with the power transistor 39. Power transistor 39 is command actuated by circuit 38, and in turn electronically permits or denies the flow of heater element 41 DC current to ground contact 44. Heater element 41, which is connected through electric DC current limiting fuse 42 to the vehicle battery 36, and which is further connected to heat exchange unit 10's thermal limiting fuse 43 through closed relay contact 40, connects to power transistor 39. Thermister sensor 32 is mounted as close to the entry point of the fuel into the engine as is feasible and in the case of a carburetor with an accessible float bowl, the thermister sensor 32 may optionally be mounted through the wall of the float bowl.

The use of the device in conjunction with a gasoline fired, internal combustion engine, a diesel engine, or an oil burner enables the fuel to be brought to an optimum temperature for its particular application, thus insuring more complete combustion of the fuel and thus resulting in fuel economy.

For diesel-fueled vehicles this preheating eliminates gelling and paraffin wax formation that occurs in freezing ambient temperatures with resultant plugging of fuel filters and injectors. With optimum temperature diesel preheating, a fine mist of fuel is emitted from the diesel injector, thereby increasing the fuel's ability to enter into more complete combustion with the engine, thus improving fuel economy.

In operating the system in a vehicle, when the vehicle switch is turned on, the relay coil 35 is energized permitting contact switch 40 to close and permitting heater DC current to flow to the power transistor 39. When the thermister sensor 32 senses a less than optimum temperature in the fuel line, circuit 38 command actuates the power transistor 39 to close the heater circuit, with resultant DC current flow from battery 36 through heating element 41 in heat exchange unit 10 and through contact 40 to power transistor 39 and to ground 44. Heat from tubular heating element 41 flows through the heat exchanger's cylinder 10 directly into the fuel carried in tubes 12—12.

When the fuel line thermister sensor 32 senses a one-half degree Farenheit fuel temperature above the set optimum temperature, the circuit 38 command actuates the power transistor 39 to open the heater circuit, interrupting the flow of DC current through heating element 41 and flow of heat through heat exchange cylinder 10 into the fuel carried in tubes 12—12. Thus the system cycles on and off in response to fuel line temperature maintenance as measured at the entrance to the engine or oil heater. In conditions where extremely low ambient temperatures are encountered for a vehicle having a water cooled engine, the heat introduced to the fuel may be augmented by means of a separate heat exchanger in series utilizing waste heat from the engine's radiator.

The device of applicant provides a means to more precisely control fuel temperature by maintaining an optimum temperature for best fuel economy. The heat exchanger designed furnishes optimum heat transfer directly into the fuel, thus minimizing under or over temperature excursions of the fuel as power is cycled on and off. The design of the actual heat exchange unit 10 minimizes material and labor costs in its manufacturing.

While this invention has been described in its preferred embodiment, it is appreciated that variations thereon may be made without departing from the scope and spirit of the invention.

What is claimed is:
1. A preheater for liquid fuel to be used in a device designed to burn said fuel comprising
   a single, unitary cylindrical member provided with a first axially positioned conduit, circular in cross section, extending throughout the entire length of said cylindrical member,
   an electrical resistance heating element positioned within said first conduit and electrically insulated therefrom,
   a plurality of second conduits, circular in cross section, equi-spaced around and parallel to said first axially positioned conduit and extending throughout the entire length of said cylinder and adapted to carry fuel therein,
   means connecting the ends of said plurality of second conduits together so that said second conduits are at least in one series connection, one end of said series connected second conduits being provided with means connecting said one end of said series connected second conduits to a source of fuel and the other end of said series connected second conduits being provided with means connecting said other end of said series connected second conduits to said device designed to burn said fuel, both said means for connecting said one end of said series connected second conduits to a source of fuel and said means for connecting said other end of said series connected second conduits to said device to burn said fuel being located at the same end of said cylindrical member,
   a temperature sensor located in said means connecting said other end of said series connected second conduits to said device designed to burn said fuel and positioned adjacent to said device designed to burn said fuel,
   means, responsive to a signal from said temperature sensor, for activating or deactivating said electrical resistance heating element.

2. The preheater of claim 1 in combination with a gasoline powered internal combustion engine.

3. the preheater of claim 1 in combination with a diesel engine.

4. The preheater of claim 1 in combination with a fuel oil heater.

5. The preheater of claim 1 wherein the means connecting the ends of said plurality of second conduits together comprises a series of slots in the ends of said cylindrical member.

6. The preheater of claim 1 wherein said means connecting the ends of said plurality of second conduits together are end caps provided with channels therein, said end caps being securely attached to opposite ends of said cylindrical member.

7. The preheater of claim 6 wherein said end caps are attached to said cylindrical member by axially positioned hollow bolts threaded into said cylindrical member.

8. The preheater of claim 2 wherein said internal combustion engine is water cooled and is provided with a radiator, a heat exchanger in series with said preheater and having one end of the fuel portion of said heat exchanger connected to the means connecting said one end of said series connected second conduits of said preheater, and the other end of the fuel portion of said heat exchanger being provided with means associated with said heat exchanger connected to said source of fuel, said heat exchanger being heated with hot water from said engine's radiator.

9. The preheater of claim 2 wherein said diesel engine is water cooled and is provided with a radiator, heat exchanger in series with said preheater and having one end of the fuel portion of said heat exchanger connected to the means connecting said one end of said series connected second conduits of said preheater, and the other end of the fuel portion of said heat exchanger being provided with means associated with said heat exchanger connected to said source of fuel, said heat exchanger being heated with hot water from said engine's radiator.

10. The preheater of claim 8 wherein said hot water heat exchanger may be deactivated by closing off the source of hot water.

11. The preheater of claim 9 wherein said hot water heat exchanger may be deactivated by closing off the source of hot water.

12. The preheater of claim 1 wherein said cylindrical member comprises a one piece extrusion with integrally formed said second conduits.

13. The preheater of claim 1 wherein said cylindrical member is made from a material having a high coefficient of heat transfer.

14. The preheater of claim 1 wherein said cylindrical member is made from aluminum alloy.

15. The preheater of claim 1 wherein said cylindrical member is made from copper alloy.

16. The preheater of claim 1 wherein the means connecting the ends of said plurality of second conduits together connects all of said second conduits in a single series connection.

* * * * *